Aug. 8, 1933.  W. A. RIDDELL  1,921,541
CAMERA SHUTTER
Filed Nov. 28, 1931
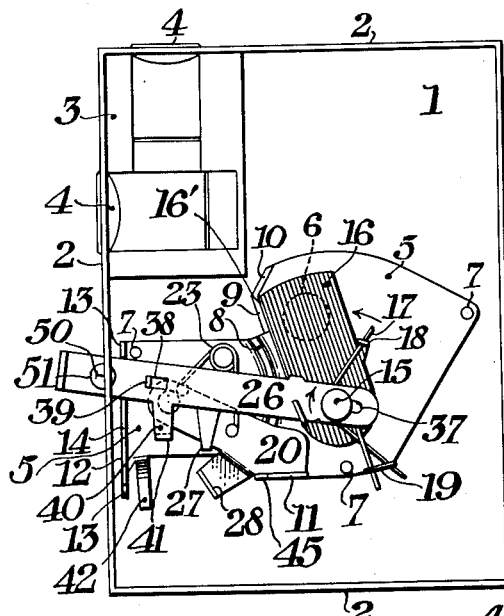
Fig.1.
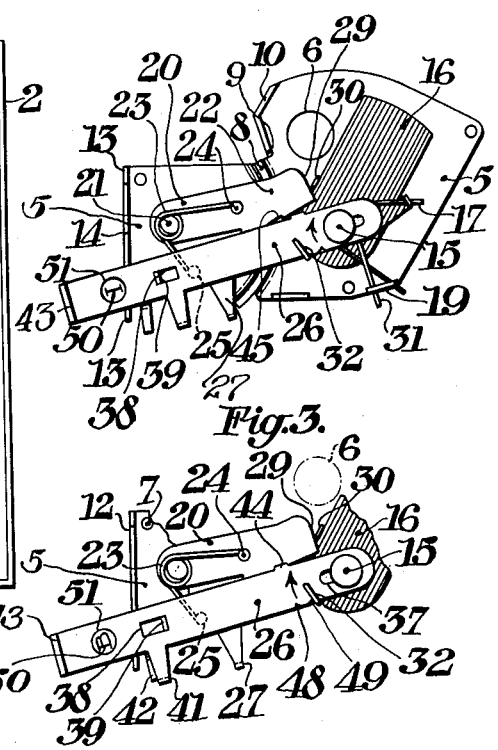
Fig.2.
Fig.3.
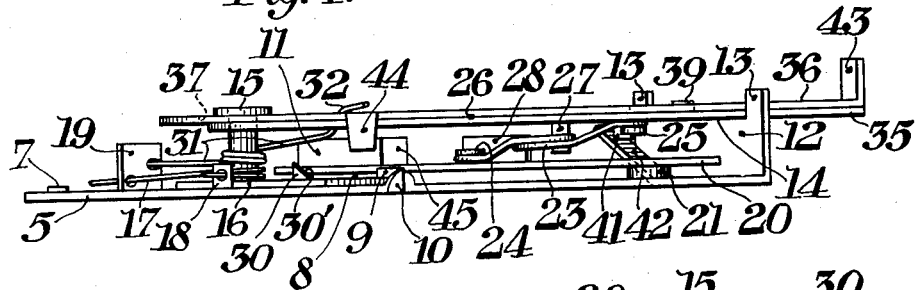
Fig.4.
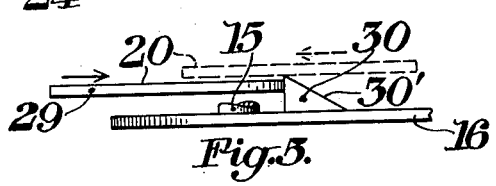
Fig.5.
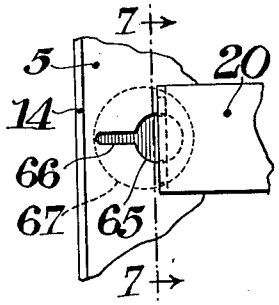
Fig.6.
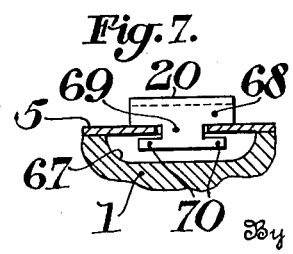
Fig.7.
Inventor:
William A. Riddell,
Donald H. Stewart,
Newton M. Perrins
By
Attorneys Patented Aug. 8, 1933

1,921,541

UNITED STATES PATENT OFFICE 1,921,541

CAMERA SHUTTER

William A. Riddell, Rochester, N. Y., assignor to Eastman Kodak Company, Rochester, N. Y., a Corporation of New York Application November 28, 1931
Serial No. 577,840

11 Claims. (Cl. 95—59)

This invention relates to photography and more particularly to photographic cameras.

One object of my invention is to provide a simple and efficient camera shutter by which an exposure of a definite duration can be obtained and by which prolonged exposures can be obtained.

Another object of my invention is to provide a simple type of camera shutter having a minimum number of operating parts, both in the construction of the shutter and for the purpose of operating the shutter.

Another object of my invention is to provide a single trigger by which both the normal "instantaneous" exposures and the "bulb" exposures may be obtained by merely adjusting the trigger.

Still another object of my invention is to provide a simple type of shutter in which a trigger is always moved in the same direction for making an exposure, and other objects will appear from the following specification, the novel features being particularly pointed out in the claims at the end thereof.

Coming now to the drawing wherein like reference characters denote like parts throughout.

Figure 1 is an elevation of a camera shutter constructed in accordance with and embodying a preferred form of my invention, the shutter being mounted on a box type of camera with the front cover plate removed.

Figure 2 is a similar view of the shutter shown in Figure 1 but with the parts in a different position.

Figure 3 is a fragmentary front elevation showing the shutter parts in position for a prolonged exposure.

Figure 4 is a plan view of the shutter parts removed from a camera.

Figure 5 is an enlarged fragmentary detail of a slip-off connection between the master member and the shutter blade.

Figure 6 is a fragmentary detail plane view of a modified form of pivotal mount for the master member, and Figure 7 is a section on line 7—7 of Figure 6.

While the shutter which I will describe as a preferred embodiment of my invention is shown as being particularly adapted for use on relatively inexpensive box type of cameras, it is quite obvious that by adjusting the parts to a compact casing this shutter might be equally suitable for other types of cameras.

Referring to Figure 1, the camera may consist of the usual front block 1 having top, side and bottom walls 2 in one corner of which there is supported a block 3 for the view finders 4. The walls 2 and the block 1 are ordinarily covered by a cover plate which is not shown.

In the present instance the shutter is mounted on the front plate 1 and may consist of a metal base plate 5 which is apertured at 6 to permit light rays to enter the camera through an objective which is carried by the plate 1. This plate may be attached by means of fastening devices 7 and is preferably provided with a formed-up portion 8 having a rounded top which provides a slideway on which the master member may turn freely. The edges 9 and 10 are also formed upwardly to form stops, and still another stop 11 is bent up from the lower edge of the plate. As best shown in Figure 4, the plate 5 is provided along one end with a formed-up flange 12 having lugs 13 to either side of a central cutaway portion 14 to form a guideway for the shutter trigger as will be hereinafter more fully described.

Referring again to Figure 1, the shutter plate 5 carries a stud 15 upon which a shutter blade 16 is pivotally mounted. One edge 16' of this shutter blade normally lies against a stop 9 because a spring 17 engages a shutter lug 18, encircles the stud 15 and also engages a lug 19 on the plate 5 and tends to thrust the shutter blade in the direction shown by the arrow. This has a light spring since the shutter blade is only of light weight material and turns very freely upon the stud 15.

In order to turn the shutter blade about the pivot 15 there is a master member 20 mounted upon a post 21 so that it may turn freely thereon. One portion 22 of the master member is adapted to slide on the curved guide rail 8, thus reducing friction to a minimum.

The master member may be swung about its pivot 21 by means of a hair-pin spring 23 which is connected at 24 to the master member and at 25 to a trigger 26. The trigger 26 is pivoted to the stud 15 and is limited in its movement in two directions by the lugs 13 which project upwardly at each end of the guideway 14.

When the trigger 26 is moved from the position shown in Figure 1, the hair-pin spring 23 is first placed under tension. During the first part of this movement, the arm 27 on the trigger 26 rides on the upwardly turned flange 28 which is carried by the master member 20 and prevents the master member from turning during the tensioning movement of the spring. However, when the downwardly turned lug 27 moves past the end of the upwardly turned flange 28, the master member 20 snaps over from the position shown in Figure 1 to the position shown in Figure 2, wherein the end 29 of the master member 20 is shown as being in a position from which it will shortly slide past the lug 30 carried by the trigger 16. As soon as the master member slips off this lug, blade 16 reverses its movement until it rests against the edge of the stop 9, and the trigger is free to return to its normal position of rest, as shown in Figure 1, under the impulse of its own spring 31. Thus, the movement of the trigger 26 in one direction makes an exposure. In order to return the trigger and with it, of course, the master member to its initial position, there is a relatively heavy spring 31 which engages a lug 19 on the plate 5 and which also engages at 32 one side of the trigger. This spring thrusts the trigger in the direction shown by the arrow and as soon as the trigger is released by an operator, this spring moves it back to the position shown in Figure 1 which is the normal position of rest.

In the backward movement, it is, of course, necessary to leave the shutter blade 16 over the exposure aperture 6. Consequently, the construction shown in Figure 5 is employed. As shown in this figure, the lug 30 which is engaged by the master member 20 to open the shutter to make an exposure is wedge-shaped, there being a slanting side 30' which forms a slideway for the shutter blade. When the master member 20 moves in the direction shown by the arrow, the blade 16 is rotated upon its pivotal support 15. However, after the blade returns to its normal position of rest under the impulse of spring 17, the master member must return to its normal position and in this return movement, as shown in dashed lines in Figure 5, the master member merely swings up over the lug and slides past the shutter without moving it.

As can be seen from Figure 1, the normal position of rest of the shutter blade 16 is such that on the return movement the master member has no tendency to swing the shutter blade open.

I prefer to mount the master member very loosely on the plate 5 so that it can both turn on this mount and so that it can also move axially of its pivotal point. A stud 21 may be used as above described, but in the modified form of the mounting, shown in Figures 6 and 7, has the additional advantage of being a simple assembling proposition and permitting the master member to turn easily. As shown in Figures 6 and 7, the plate 5 may be provided with an aperture 65 from which a key slot 66 extends in one direction. Beneath the aperture 65—66, there is an enlarged cut-out portion 67 in the front camera block 1. The master member 20 is provided with a downwardly extending end 68 having a narrow portion 69 and lugs 70 extending to each side of the narrow portion. The master member may be assembled by merely turning it so that the downwardly bent portion 68 is parallel to the slot 66 and by turning the lugs 70, the master member will be held in place and may turn on the plate 5 freely. This forms a very simple assembling proposition and also permits the master member to move up and down and turn upon its connection with plate 5.

For making an "instantaneous" exposure, the parts may be operated as above described. However, it is necessary to make exposures of longer duration for certain subjects. To accomplish this result, the following structure is used. As indicated in Figure 4, the trigger designated broadly as 26 is made up of two pieces of material. One piece 35 may be considered the trigger proper and the other piece 36 will be called a lever. These two parts move together to make an instantaneous exposure but when a time exposure is made, the lever 36 may be slid upon the trigger 35 being guided in the following manner. The stud 15 projects up through a slot 37 in the lower end of the lever and in the upper end of the lever part 36 is provided with an aperture 38 which engages a lug 39 struck up from the trigger. Thus, while the trigger and lever always move together about the pivot 15, the lever may be slid longitudinally of the lever through the pin and slot connections.

In order to resiliently retain lever 36 in the set position with respect to trigger 35, lever 36 is provided with cut out notches 48 and 49 adapted to engage and form a snap latch with the spring end 32, one notch defining the "bulb" position and the other the "instantaneous" position.

As will be noted in Figure 1 when the parts are in position for an instantaneous exposure, the arm 40 with its downwardly turned lug 41 turns beyond the path of a spring latch member 42. When these parts are not engaged, they do not affect the operation of the shutter. When it is desired to make a long exposure, the handle 43 is pulled outwardly, thus moving the lug 41 into the path of the spring latch 42 so that when the trigger is depressed to open the shutter 16, the trigger will be latched by the spring latch 42 in its lowermost position, as illustrated in Figure 3. It will be noted that when in this position, the lug 44 holds the master member from completing its movement under the impulse of spring 23 since lug 44 engages the lug 45 which is bent upwardly from the master member. By stopping the master member before the end of its movement is reached, the lug 30 on the shutter blade still engages the end 29 of the master member and the shutter blade 16 is consequently held in the open position shown in Figure 3. The parts will be retained in this position until the lever is moved relative to the trigger by pushing in on the handle 43. This moves the lug 41 from the end of the spring latch 42 and the lug 44 from in front of the lug 45 of the master member and permits the parts to snap back to their normal position of rest and the parts are again positioned for an instantaneous exposure.

In order to notify an operator as to which exposure is to be made, I prefer to provide a scale showing indicating marks 50 on the trigger and a window 51 on the lever so that when the handle 43 has been pulled out, the letter "B" indicating "bulb" exposure will appear and when the handle is pushed in, the letter "I" indicating "instantaneous" exposure will appear. It is, of course, immaterial on which of the two slidable members the scale appears and on which of the two slidable members the window appears, it being only necessary to provide some form of indicating devices by which the operator can tell the setting of the shutter. It should be noted that this form of adjustment is very suitable for box cameras because the trigger and the lever for adjusting the shutter for bulb or "instantaneous" exposure both project through a single slot in the camera wall so that a much neater camera can be made with this construction.

The operation of the shutter is extremely simple. In making "instantaneous" exposures, the handle 43 is moved until the letter "I" appears in the window 51. The shutter trigger is then moved downwardly during which movement the shutter blade 16 opens and closes to make an exposure. After the trigger is released it returns to its normal position of rest.

When an exposure of greater duration is desired, the handle 43 is pulled outwardly until the letter "B" appears in the window 51, thereby moving the lever into a position in which it will cooperate with the spring latch 42. By depressing the trigger, it will be latched in its lowermost position in which position the shutter blade will be held in an open position. After the exposure has continued as long as desired, the operator merely pushes in on handle 43, releasing the spring latch and permitting the shutter blade 16 to close and the remaining movable parts to return to their normal position of rest.

Exposures of greater duration than "instantaneous" occur much more rarely than "instantaneous" exposures and consequently my shutter has a considerable advantage in that the trigger is automatically restored to the "instantaneous" setting each time an exposure of longer duration is made, because slide 36 must be pushed in by handle 43 to release the cooperating elements of the shutter mechanism which produce time exposures, that is, to release parts 41, 42, 44 and 45 the latter forming a snap latch. When a bulb exposure is thus terminated, another actuation of the trigger, without further adjustment, will produce an "instantaneous" exposure. This is very desirable, as it eliminates the chance of forgetting to set the camera shutter after a bulb exposure for exposures of the usual type.

What I claim is:

1. In a shutter for cameras, the combination with a pivotally mounted shutter blade, of a master member adapted to swing the shutter blade upon its pivot from a position of rest, a trigger adapted to move in one direction from a position at rest to make an exposure, a spring connecting the trigger and master member for transmitting power to the latter, and a second spring of greater magnitude than the first mentioned spring for moving the trigger to its position of rest thereby returning the master member through its spring connection with the trigger.

2. In a shutter for cameras, the combination with a pivotally mounted shutter blade, of a master member adapted to swing the shutter blade upon its pivot from a position of rest, a slip-off connection between the master member and shutter blade permitting the former to drive the latter in one direction and to idle past the shutter blade when moving in an opposite direction, a trigger adapted to move in one direction from a position at rest to make an exposure, a spring connecting the trigger and master member for transmitting power to the latter, and a second spring of greater magnitude than the first mentioned spring for moving the trigger to its position of rest thereby returning the master member through its spring connection with the trigger, whereby said master member may idle past the shutter blade in returning to its position of rest.

3. In a shutter for cameras, the combination with a shutter blade, of a master member for driving the shutter blade in one direction, means for energizing the master member including a spring, and a trigger, said spring being connected to the master member and trigger for driving the former in one direction when the trigger is moved and a second spring acting on the trigger tending to move the trigger to one position, whereby the master member may be also moved to one position through the spring connecting the master member and trigger.

4. In a shutter for cameras, the combination with a shutter blade, of a master member for driving the shutter blade in one direction, means for energizing the master member including a spring, and a trigger, said spring being connected to the master member and trigger for driving the former in one direction when the trigger is moved from a normal position of rest, a second spring adapted to restore the trigger to its normal position of rest after making an exposure, said spring being of sufficient strength to also return the master member, through the spring connecting the trigger and master member, whereby the trigger moves in one direction only for making an exposure.

5. In a shutter for cameras, the combination with a trigger, of a shutter blade and mechanism for operating the blade from the trigger including a spring and movable members, means for holding the shutter blade open including a latch and a lever slidably mounted on the trigger and having a stop movable to or from the path of said latch whereby said latch is adapted to hold the shutter blade open.

6. In a shutter for cameras, the combination with a trigger, of a shutter blade and mechanism for operating the blade from the trigger including a spring and movable members, means for holding the shutter blade open including a spring latch, and a lever slidably mounted on the trigger and having a stop adapted to be positioned in the path of said spring latch for holding the movable parts including the shutter blade in an open position, said lever being slidable on the trigger to release the latch.

7. In a shutter for cameras, the combination with a trigger, of a shutter blade and mechanism for moving the shutter blade to make an exposure, said mechanism being connected to the trigger through a spring, a second spring adapted to overcome the first spring and to return the mechanism to a normal position of rest, a latch member, and a lever slidably mounted on the trigger adapted to slide into a position to engage said latch to hold the shutter parts from a normal position of rest.

8. In a shutter for cameras, the combination with a trigger, of a shutter blade and mechanism for moving the shutter blade to make an exposure, said mechanism being connected to the trigger through a spring, a second spring adapted to overcome the first spring and to return the mechanism to a normal position of rest, a latch member, and a lever slidably mounted on the trigger adapted to slide into a position to engage said latch to hold the shutter parts from a normal position of rest, means on the trigger and cooperating with the lever for indicating the position of the latter.

9. In a shutter for cameras, the combination with a trigger, of a shutter blade and mechanism for moving the shutter blade to make an exposure, said mechanism being connected to the trigger through a spring, a second spring adapted to overcome the first spring and to return the mechanism to a normal position of rest, a latch member, and a lever slidably mounted on the trigger adapted to slide into a position to engage said latch to hold the shutter parts from a normal position of rest, means on the trigger and cooperating with the lever for indicating the position of the latter comprising indicating marks and a window, one on the lever and the other on the trigger whereby the relative setting of the parts appears through the window.

10. In a shutter for cameras, the combination with a movably mounted shutter blade, of mechanism for operating the shutter blade for instantaneous exposures, a trigger for operating said mechanism, a slide mounted on the trigger cooperating with the said mechanism when in one position to produce bulb exposures of longer duration than the instantaneous exposures, it being necessary to move the slide on the lever to complete a bulb exposure, thereby moving the slide out of cooperative relation with the said shutter mechanism so that the trigger and slide are positioned for instantaneous exposures.

11. In a shutter for cameras, the combination with a movable shutter blade, of mechanism for operating the shutter blade for bulb and instantaneous exposures, including a trigger and a slide mounted on the lever, said slide being movable between two positions on the trigger, one position for cooperating with said mechanism for producing bulb exposures, the other position for instantaneous exposures, said slide necessarily being moved from its bulb position cooperating with said shutter mechanism to complete a bulb exposure whereby the trigger after a bulb exposure is automatically restored to an instantaneous exposure setting.

WILLIAM A. RIDDELL.